(No Model.) 6 Sheets—Sheet 2.
E. DEMING.
AUTOMATIC SAFETY ELECTRIC SYSTEM FOR RAILWAYS.
No. 452,872. Patented May 26, 1891.
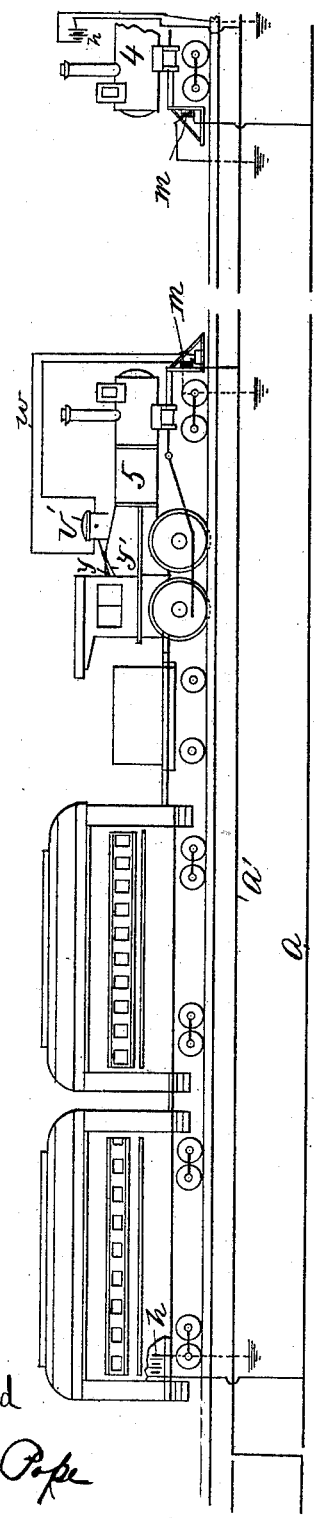
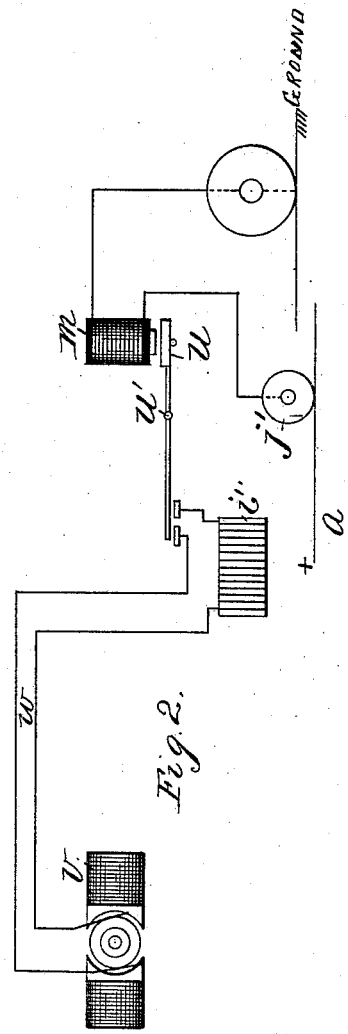
Witnesses
Will A. Courtland
Nellie L. Pope
Inventor
Edward Deming
BY HIS ATTORNEY
Edward P. Thompson

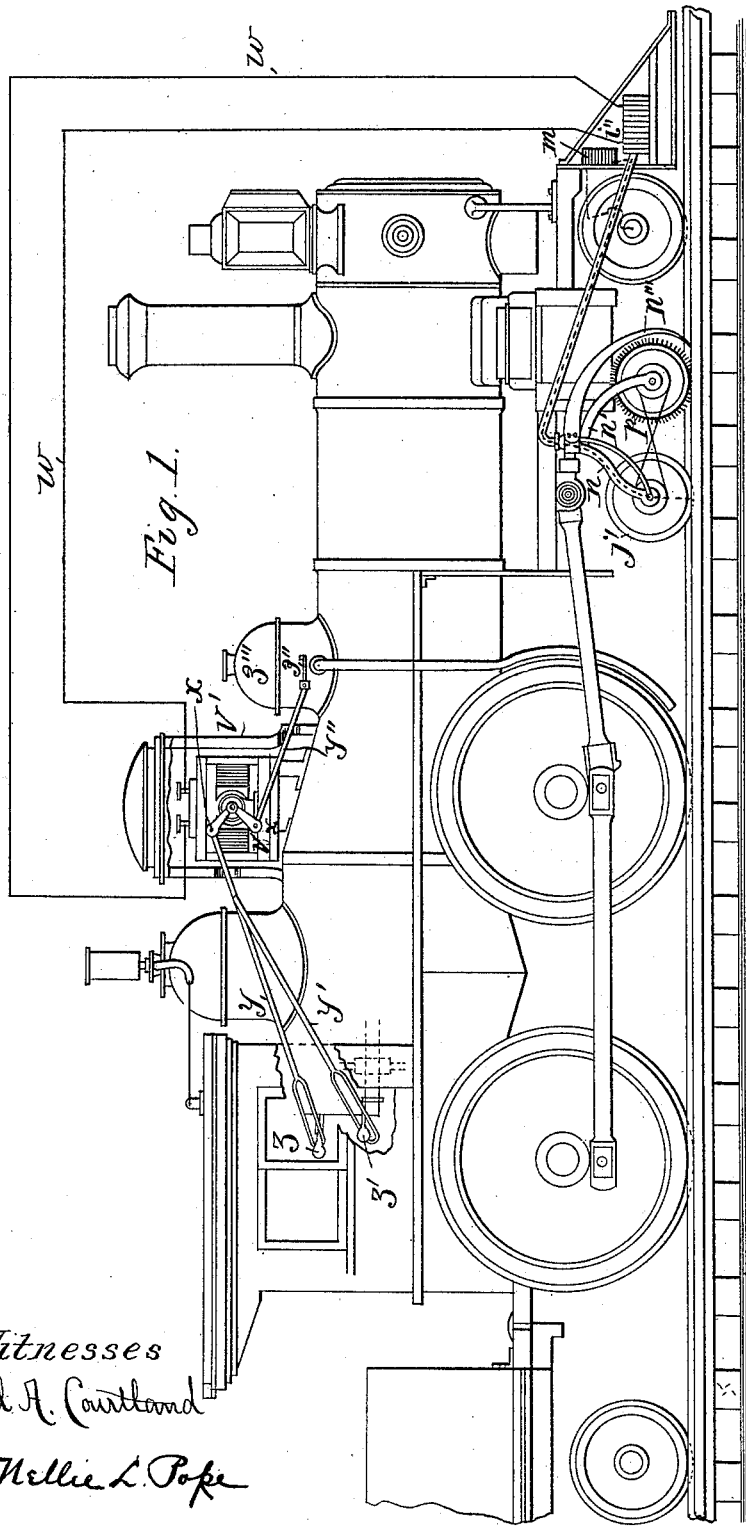

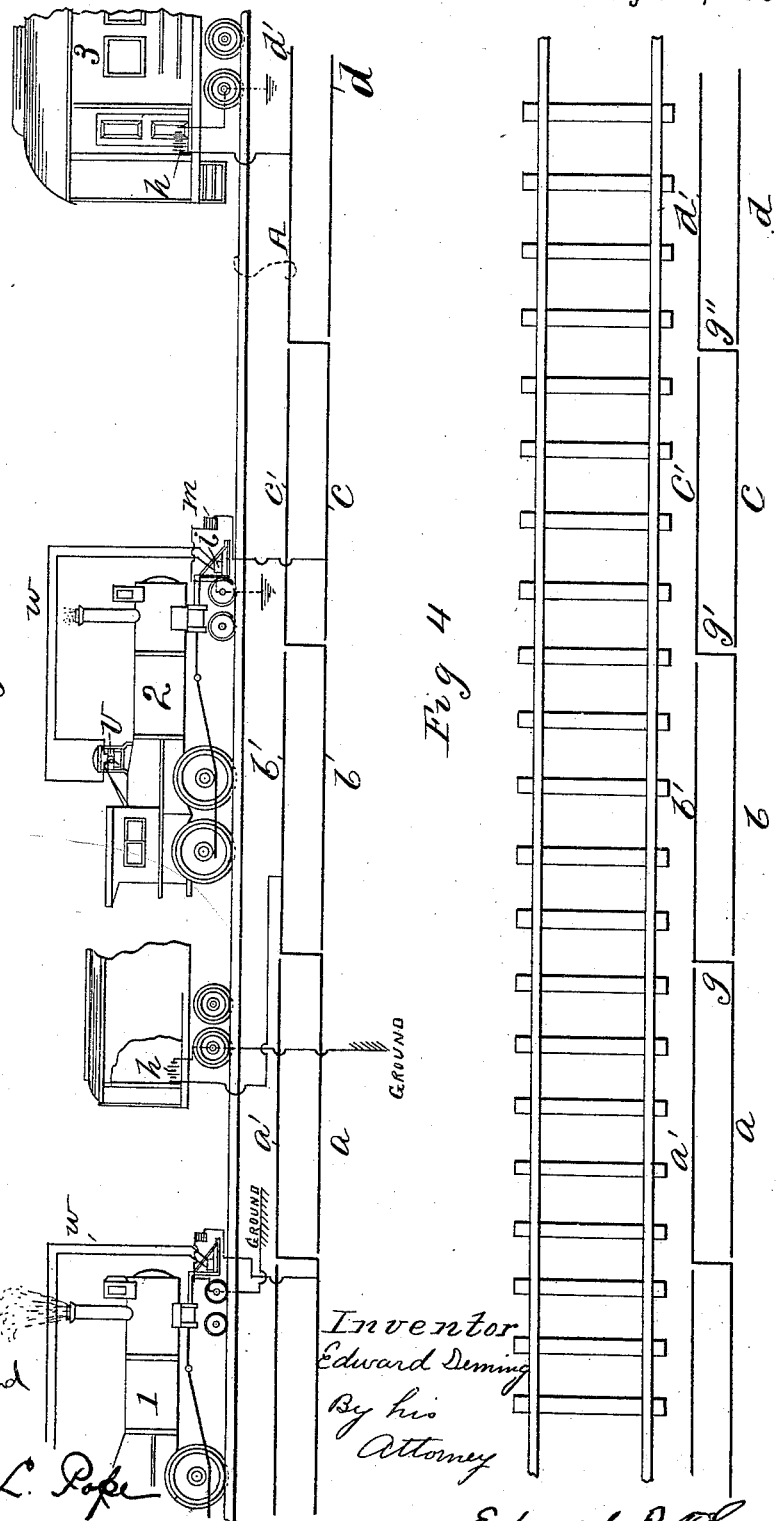

(No Model.) 6 Sheets—Sheet 4.
E. DEMING.
AUTOMATIC SAFETY ELECTRIC SYSTEM FOR RAILWAYS.
No. 452,872. Patented May 26, 1891.
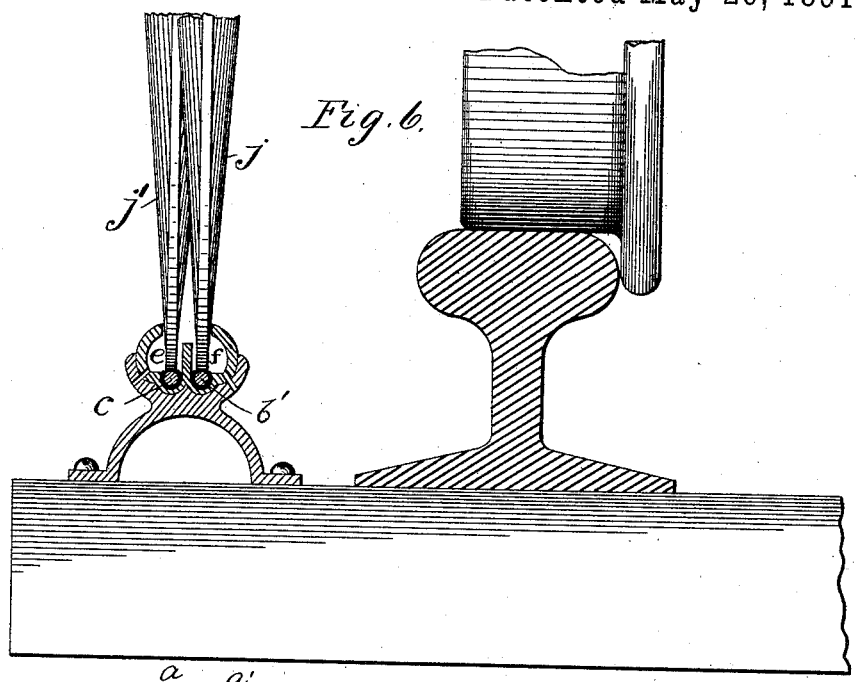
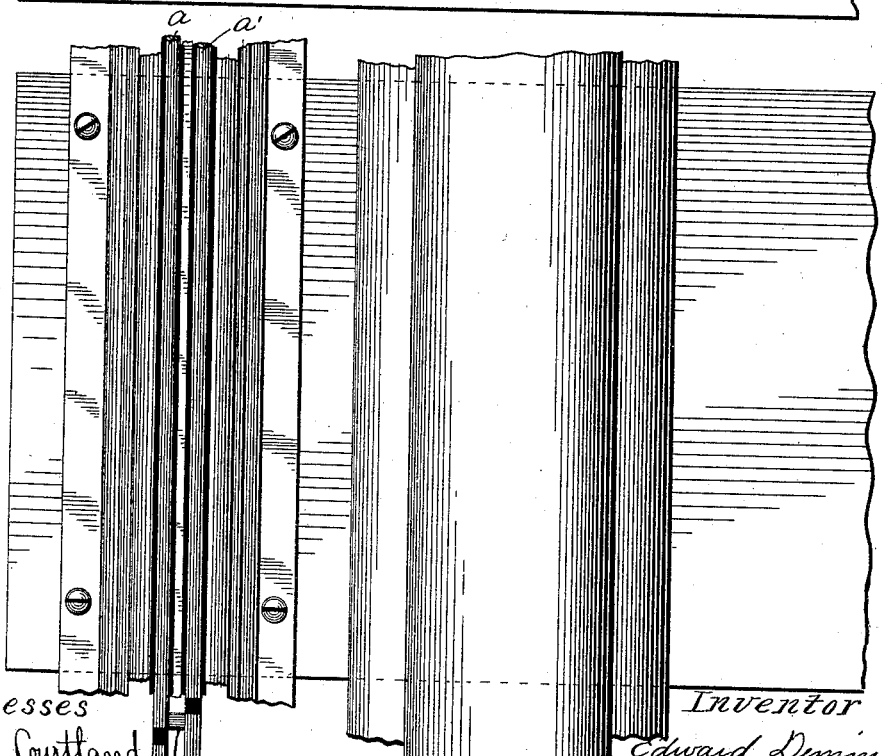

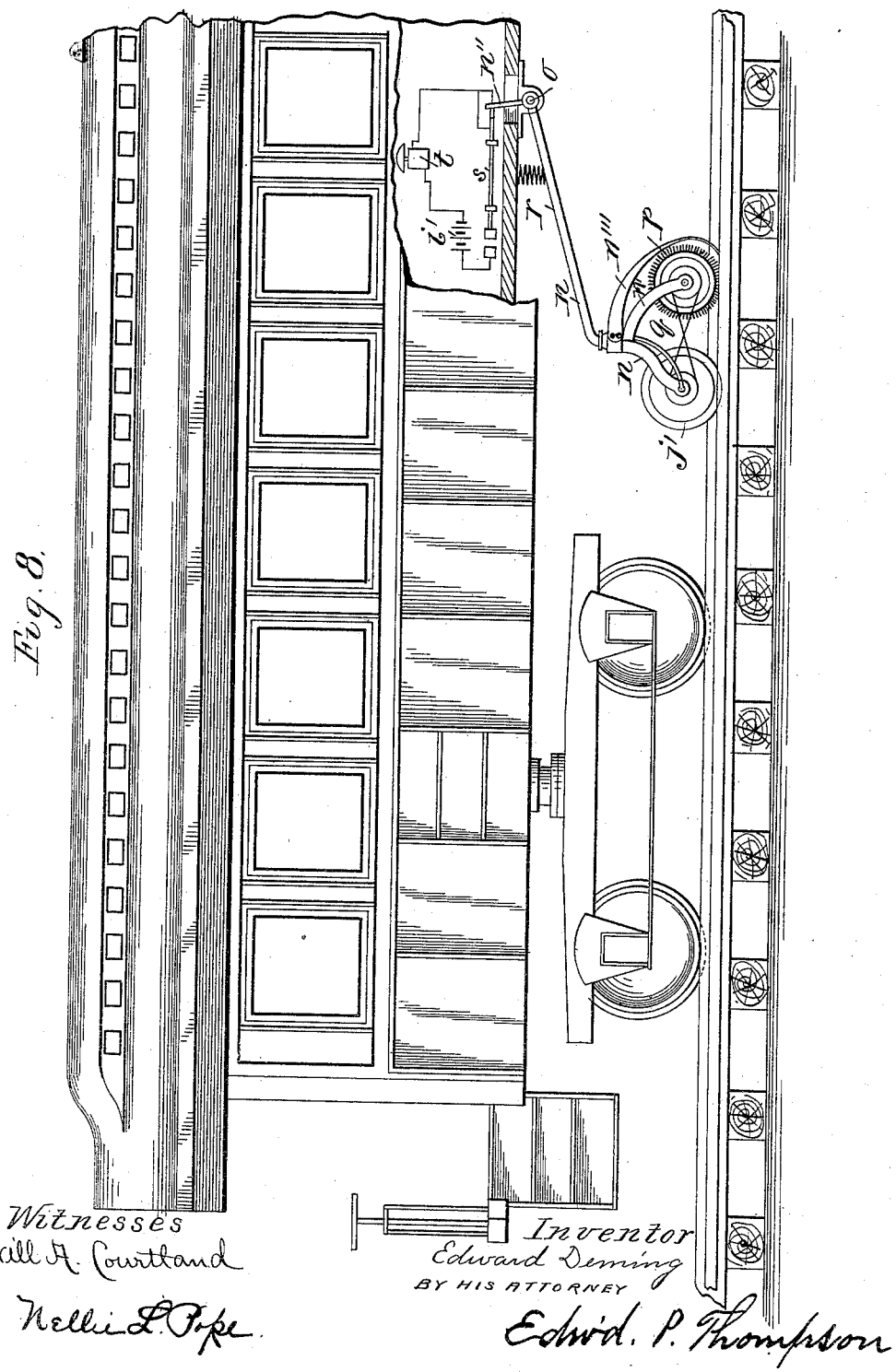

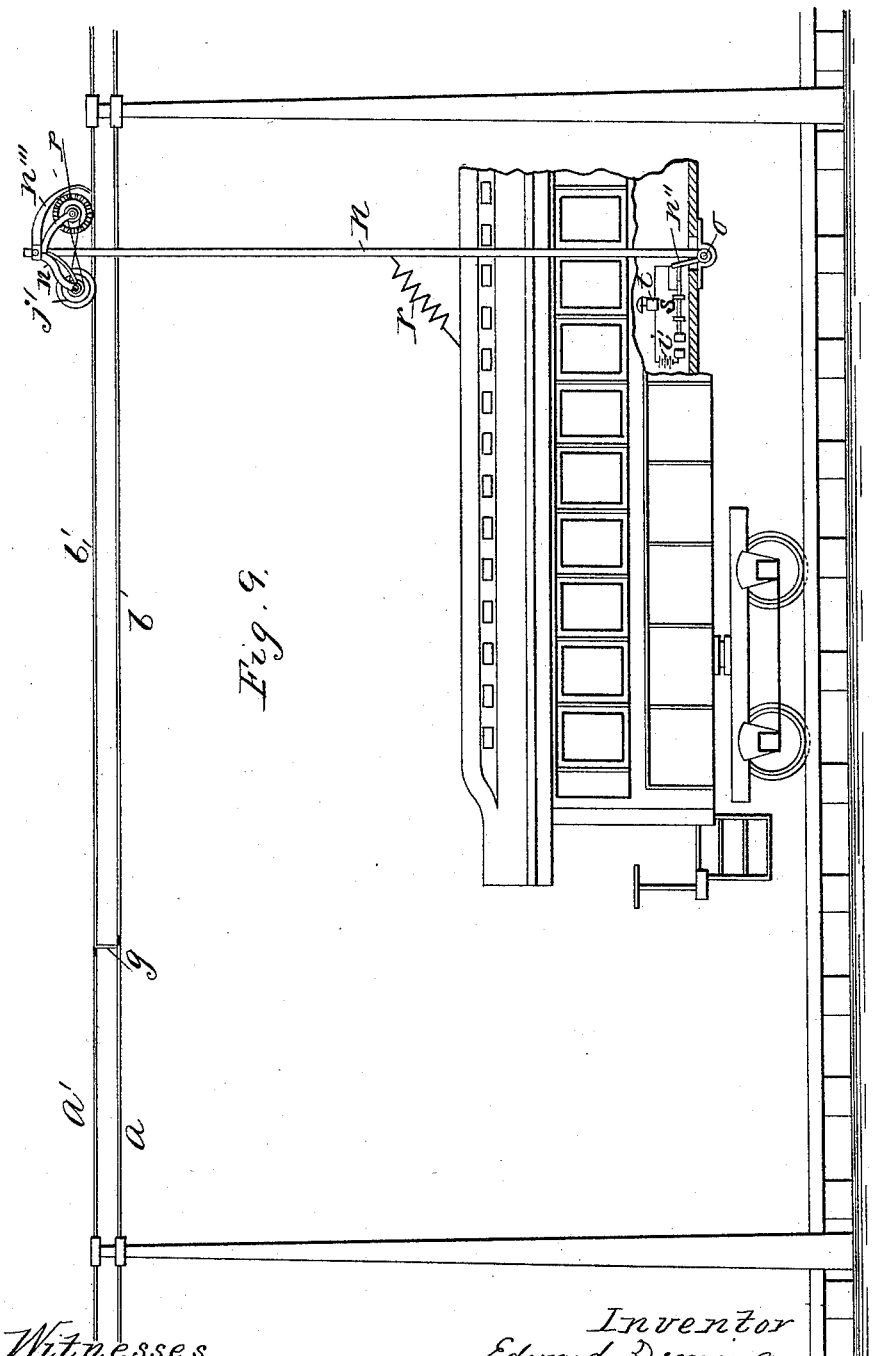

UNITED STATES PATENT OFFICE.

EDWARD DEMING, OF BROOKLYN, ASSIGNOR OF TWO-THIRDS TO ADOLPH KAUFMANN AND ISAAC STERN, OF NEW YORK, N. Y.

AUTOMATIC SAFETY ELECTRIC SYSTEM FOR RAILWAYS.

SPECIFICATION forming part of Letters Patent No. 452,872, dated May 26, 1891.

Application filed September 20, 1890. Serial No. 365,628. (No model.)

*To all whom it may concern:*

Be it known that I, EDWARD DEMING, a citizen of the United States, and a resident of Brooklyn, county of Kings, and State of New York, have invented certain new and useful Improvements in Automatic Safety Electric System for Railways, (Case 2,) of which the following is a specification.

My invention relates to a system of electric distribution and mechanism for use on railways and railway-trains for the purpose of preventing accidents which happen so often by one train running into another while on the same track and both going either in the same direction with different velocities or in opposite directions, or one being in motion and the other stationary.

The object of my invention is to stop one or more trains when in motion dangerously near each other entirely independently of the engineer.

The principle and details of the invention are described by reference to the accompanying drawings.

Figure 1 is a side elevation of a locomotive with parts broken away so as to exhibit the equipment of that part of the system relating to my invention. Fig. 2 shows in diagram the electric circuit on board the locomotive, and a portion of the circuit passing out of the locomotive. The figure is intended to show clearly the local circuit and translating devices on the locomotive. Fig. 3 shows the complete system partly in diagram with portions of two trains, the electric circuits and translating devices being shown under the condition of two trains going in opposite directions on the same track. The system is necessarily unproportionally contracted into the small limits of the sheet, since in practice the locomotives of the two trains would be stopped many train lengths from each other. Again, details of construction are not visible in this figure. Fig. 4 shows in diagram the railway-track and the electric conductors as they normally exist along the track. Fig. 5 is a view similar to Fig. 3 under the condition of three trains dangerously near each other and adapted to travel in the same direction. Fig. 6 is a vertical view, partly in section, and Fig. 7 a plan view, partly broken away, of the conduit and one of the rails of the track, Fig. 6 showing particularly the locomotive and rear-car trolley electric-contact wheel, which, as hereinafter described, are in different portions of the conduit and on different insulated sections of the conductor. In Fig. 6 the electric-contact wheels of each trolley are supposed to be a train length apart although they appear close together in the figure. Figs. 8 and 9 represent means for giving an alarm in case the trolley of the rear car jumps the track or becomes broken, the former figure relating to the surface conduit system and Fig. 9 relating to an overhead system. Both figures show in elevation a car equipped with the alarm system.

Referring to the figures, $a\ b\ c\ d$ and $a'\ b'\ c'\ d'$ represent sectional electric conductors lying, respectively, in different apartments $e$ and $f$ of a conduit. $a$ and $b'$ are electrically connected by a conductor $g$, $b$ and $c'$ by conductor $g'$, $c$ and $d'$ by conductor $g''$, and so on throughout the length of the track.

To meet all cases—such as heavy trains running at very high speed—the conductors $a\ b\ c$, &c., should each be about one-quarter of a mile in length. The rear car of every train carries an electric generator $h$, one of whose poles is connected to a car-wheel $i$, while the opposite pole is connected to one of the wires, such as $a$ in the conduit apartment $e$, through the trolley electric-contact wheel $j$.

The locomotive is provided with a magnet $m$ whose terminals are connected, respectively, with a locomotive-wheel $i'$ and trolley electric-contact wheel $j'$ to a conductor-section, such as $a'$ in Figs. 3 and 6. The car and locomotive wheels serve to form a ground-connection through the rails of the track. The trolley consists, substantially, of an electric-contact wheel $j'$, carried by a lever $n$, which is pivoted at the pivot-joint $o$ to the under side of the car. A projecting arm $n'$ of the lever $n$ carries a circular brush $p$, which is rotated in an opposite direction to that of the wheel $j'$ by means of a crossed belt $q$. The brush touches the conduit-wire, and is for the purpose of cleaning the conduit from snow or dirt. A spring $r$ between the lever $n$ and car-body presses the trolley upon the conduit-wire. A projection $n''$ to the lever $n$ passes through a hole in the bottom of the car and lies in the path of a circuit-closer $s$, which, when moved to the left, closes the battery $i'$ through the alarm-bell $t$. If the trolley falls out of the conduit or breaks, the lever $n$ falls, and the projection $u''$ closes the circuit and gives an alarm. The flagman of the last car, hearing the bell, stops the train and replaces the trolley by a new trolley, it being the rule to carry an extra trolley with each rear car. The projection $n'''$ to the lever $n$ projects beyond the brush $p$ to remove any obstruction of considerable size, such as a stick of wood or gravel stones. The trolleys of the locomotive and rear car or for the overhead or surface conduit are substantially of the same construction. The magnet $m$ governs an armature circuit-closer $u$, pivoted at $u'$. When attracted to the magnet, it closes the circuit of the battery $i''$, located in the cow-catcher, said circuit including a motor $v$, located in the box $v'$ on top of the locomotive. This circuit is represented by the lines $w$. The shaft of the motor $v$ has two cranks $x$ and $x'$, the former being connected by rods $y$ and $y'$ to the handles $z$ and $z'$, respectively, of the throttle-valve and automatic brake-valve, and the latter by rod $y''$ to the handle $z''$ of the sand-distributer $z'''$.

Referring to Fig. 5, I explain the case of one train following another on the same track. There are three trains 1 2 3 represented in part. Train No. 2 will stop before it can reach train No. 3, because the current is closed through magnet $m$, which will close the circuit of the motor $v$, which will turn off the throttle-valve and apply the brake. The circuit is from battery $h$ on train 3 to the section $d'$, to the section $c$, to the magnet $m$ on train 2, to the track or ground, to the wheel $i$ of train 3 and to the battery $h$ again. In a similar manner the train 1 will be stopped before it reaches train 2. It will not be stopped on the section it is at in the figure, but will be stopped when on the next section to the right where trains are going in the same direction. No train will be stopped by this system unless the trolley of the rear car of one train is on the next succeeding section to that which is in contact with the trolley of the locomotive following. In order that the train 2 may again start before train 3 has gone, the flagman of train 3 first attaches the S-shaped short-circuiting conductor A so as to connect the conductor-section $d'$ to the rail or ground, and the fireman of the train 2 picks it up when he comes to it. The short-circuiting device is preferred to having circuit-breakers, which employés are apt to forget to keep normally closed or open, as the case may require. The double hook A short-circuits the battery on train 3, thus demagnetizing the magnet $m$ on train 2.

Referring to Fig. 3, two trains on the same section are automatically stopped because the battery $h$ on either train is in circuit with magnet $m$ on the other train, thereby producing similar operations of the brakes, &c., as described in reference to Fig. 5. Whenever the magnet $m$ on any train is energized, it is necessarily somewhat weak, as the batteries $h$ are not powerful and because much current is lost through the resistance of the ground. It is always powerful enough, however, to operate the circuit-closer $u$, which includes the strong storage-cells $i''$ in circuit with the motor $v$. This motor is so arranged to rotate in such a direction as to pull the throttle and brake handles in the same manner substantially as the engineer would do if he wishes to stop the train. When the trains come closer together than a predetermined distance, it makes no difference how dark it is, or what curves or tunnels may occur, or whether the engineer becomes incapacitated, the trains are going both at sixty miles an hour, yet both trains will be automatically stopped before reaching each other, provided the sections are of reasonable length.

Most of the accidents of collision which have occurred have happened simply from the fault of the engineer, although he may not be to blame; but they take place before he as a man has time to realize the conditions under which he is placed. He sees, perhaps, a train ahead, but thinks it is going as fast or perhaps faster than his own train; but in a few seconds he is horified to discover that it is standing still or even backing.

I claim as my invention—

In an electric safety system for railway-trains, the combination of sectional conductors extending in parallel compartments of a conduit, trolleys on the locomotive and rear car in contact with conductors in different compartments, the one trolley being connected electrically to a magnet on the locomotive and the other to an electrical generator on the rear car, the remaining terminals of the magnet and generator being connected to ground through the wheels on the railway-track, and an electric motor engaged with the throttle-valve, automatic brake, and sand-distributer handles in circuit with a generator which includes, also, in its circuit a circuit-closer controlled by said magnet.

In testimony that I claim the foregoing as my invention I have signed my name, in presence of two witnesses, this 15th day of September, 1890.

EDWARD DEMING.

Witnesses:
EDWARD P. THOMPSON,
E. G. DUVALL, Jr.